Sept. 16, 1969  T. J. GRUBER  3,467,222

PROGRESSIVE LUBRICANT FEEDER WITH CROSS PORTING

Filed Feb. 14, 1967  6 Sheets-Sheet 1

Fig. I

INVENTOR.
THOMAS J. GRUBER
BY
ATTORNEYS.

INVENTOR.
THOMAS J. GRUBER

BY Schramm, Kramer & Sturges

ATTORNEYS.

INVENTOR
THOMAS J. GRUBER

United States Patent Office 3,467,222
Patented Sept. 16, 1969

1

3,467,222
PROGRESSIVE LUBRICANT FEEDER
WITH CROSS PORTING
Thomas J. Gruber, Chagrin Falls, Ohio, assignor to
Eaton Yale & Towne Inc., Cleveland, Ohio, a corporation of Ohio
Continuation-in-part of application Ser. No. 424,498,
Jan. 11, 1965. This application Feb. 14. 1967, Ser.
No. 625,277
Int. Cl. F16n 25/02
U.S. Cl. 184—7                                5 Claims

ABSTRACT OF THE DISCLOSURE

A cross porting structure for lubricant feeders. The structure includes a continuous outlet passageway having a pair of outlet openings therefrom and a pair of supply passageways which alternately supply lubricant into the outlet passageway and a plug-type valve which in a first position serves to connect a supply passageway with one outlet opening, and in a second position serves to connect each of the supply passageways with both of the outlet openings.

This application is a continuation-in-part of U.S. patent application Ser. No. 424,498, filed Jan. 11, 1965 and now abandoned.

This invention relates to lubricating systems and concerns particularly a divisional feeder in which lubricant is transmitted from a central station to a plurality of lubricated devices distant therefrom such as bearings.

The invention relates to divisional lubricant feeders of the general type illustrated in Higgens Patent 2,834,433 but is not restricted to lubricant feeders having different types of valve bodies. In the course of operation of such feeders, pistons move to and fro in cylinders and for each cylinder lubricant is ejected from each of both ends of the cylinder alternately as the piston moves to and fro, and for each cylinder end chamber there is a lubricant outlet opening controlled through suitable porting in an adjacent cylinder and piston unit. It is an object of the invention to provide improved arrangements for permitting the lubricant ejected from each end chamber of a cylinder to be expelled through the same outlet opening or alternatively to cause the lubricant from each end chamber to be expelled through a different outlet opening according to the way a simple fitting is mounted in the feeder block.

Other and further objects, features and advantages of the invention will become apparent as the description proceds.

In carrying out the invention in accordance with a preferred form thereof valve blocks of the type illustrated in the aforesaid Higgens patent or generally similar valve blocks are cross drilled to provide an interconnection between outlet passageways to the two outlet openings in each valve block. Means are provided so that one or the other of the outlet openings may be plugged when desired and a fitting is provided for selectivly closing the cross drilled interconnecting passageway whenn it is desired to use both outlet openings or for leaving the interconnection open when it is desired to use only one of the outlet openings plugging the other.

A better understanding of the invention will be afforded by the following detailed description considered in conjunction with the accompanying drawings, in which.

Figure 1:
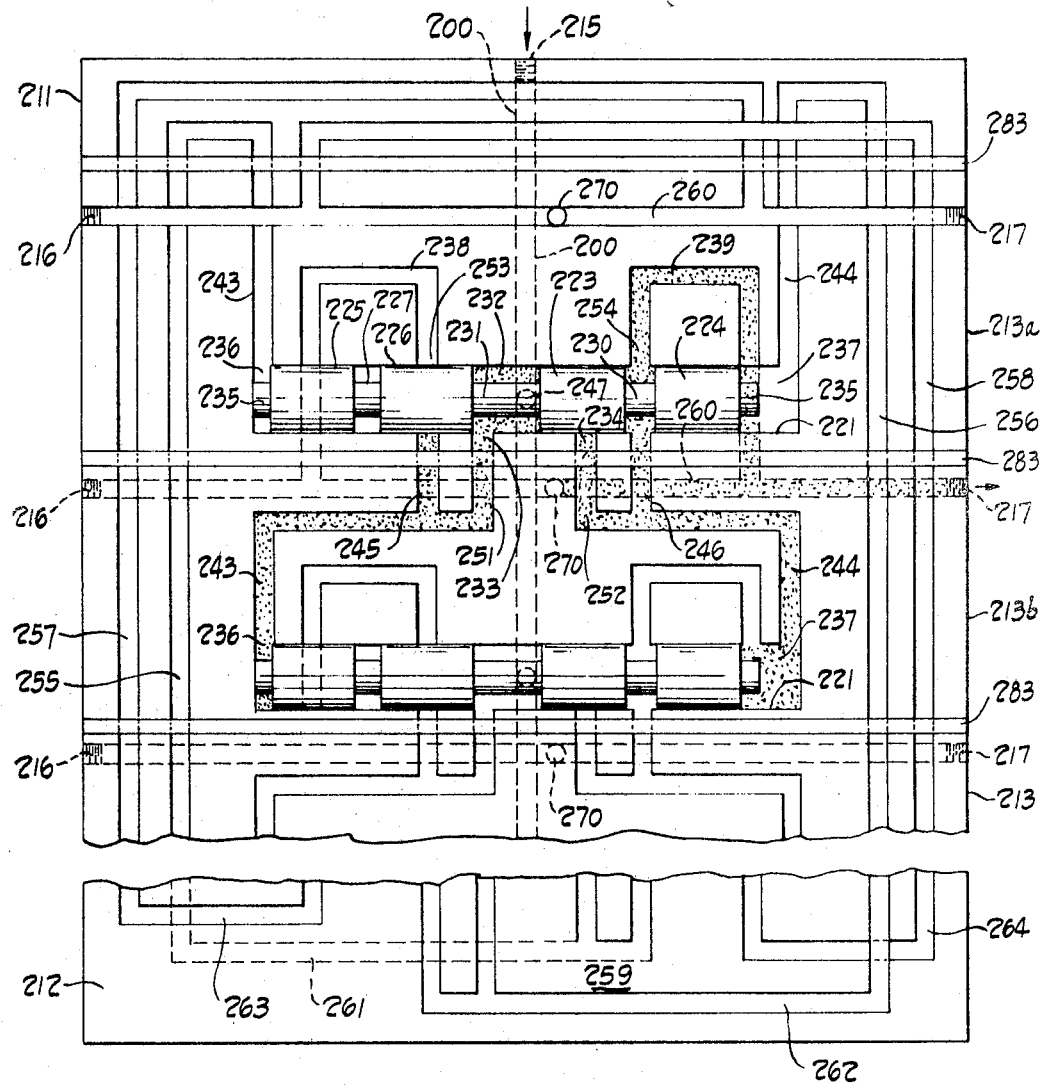
FIG. 1 is a schematic diagram and flow diagram of an embodiment of the invention with a portion of the apparatus broken away to avoid unnecessary duplication of similar components.
Figure 2:
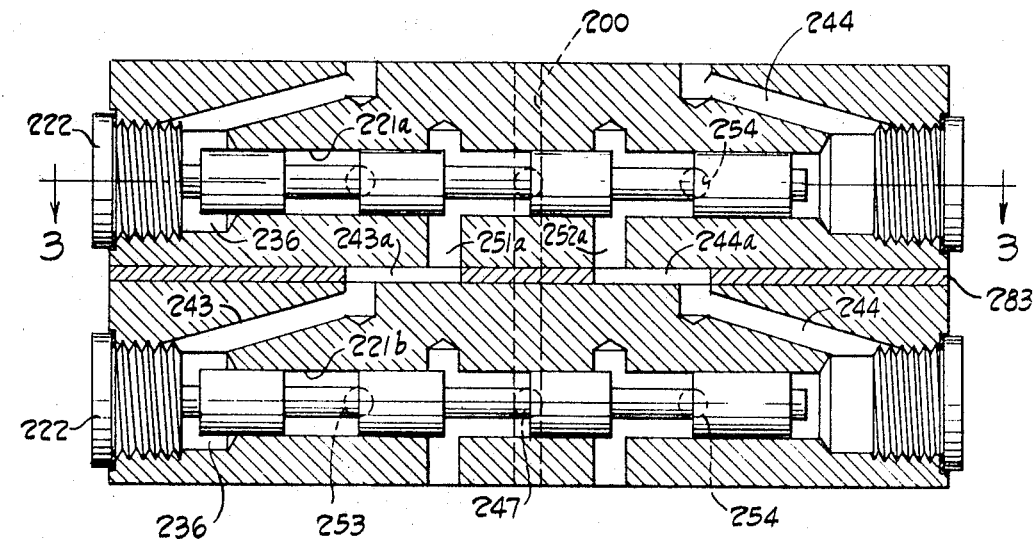
FIG. 2 is a view of a section of two of the conncted valve blocks of FIG. 1 represented as cut by a plane 2—2
Figure 3:
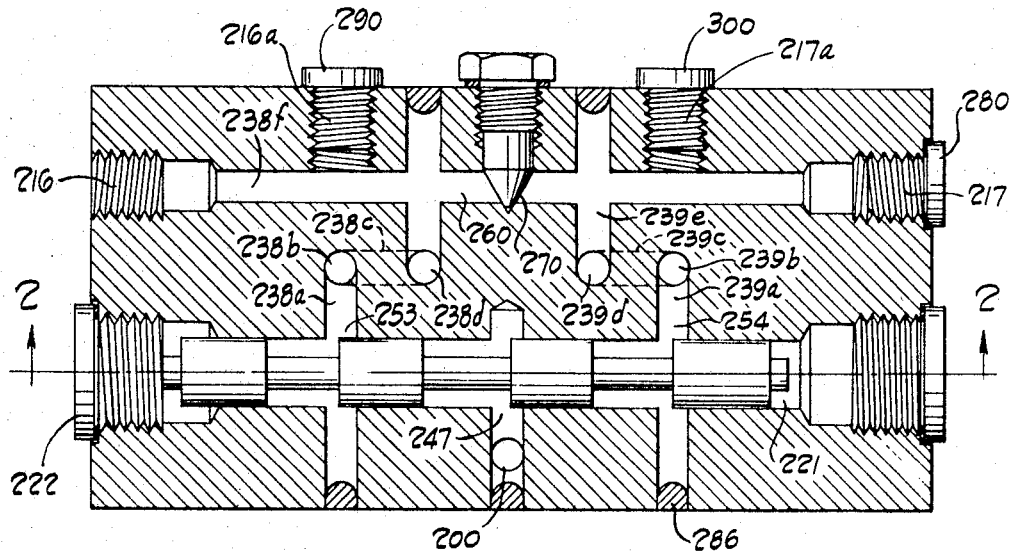
Figure 4:
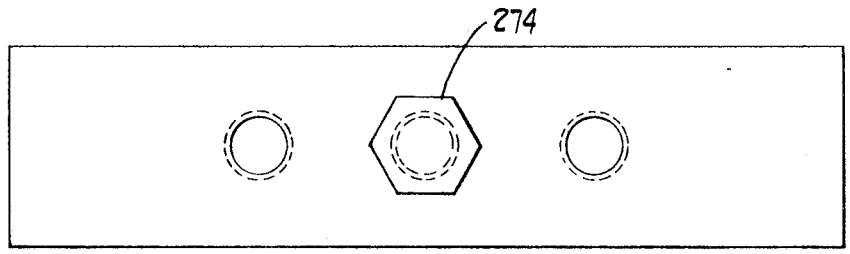
Figure 5:
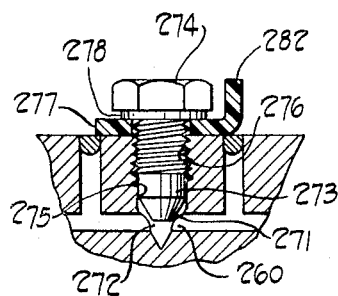
Figure 5A:
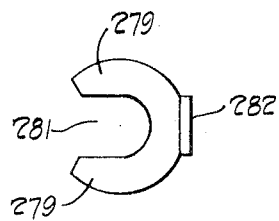
Figure 7:
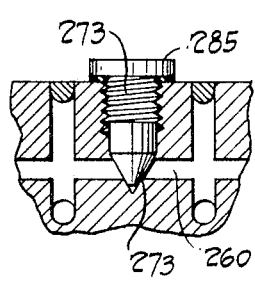
Figure 6:
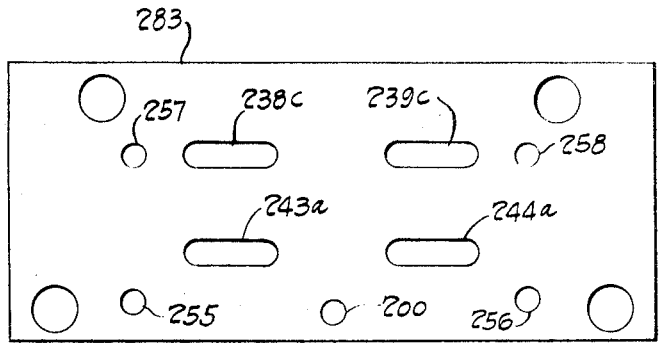
Figure 8:
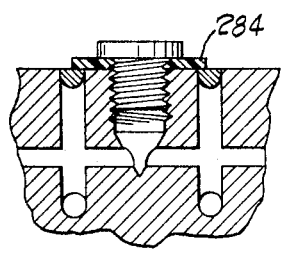
Figure 8A:
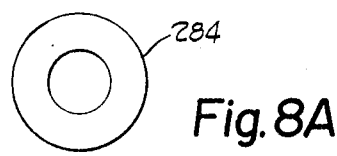
Figure 9:
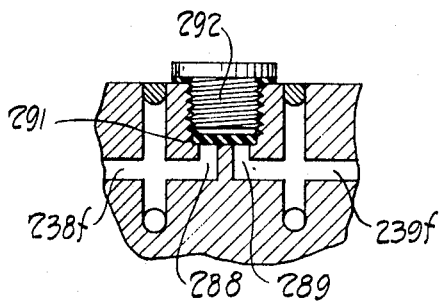
Figure 10:
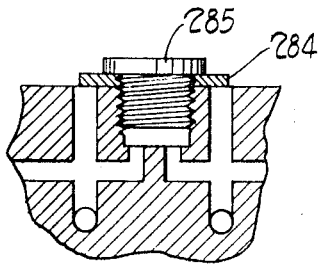
Figure 11:
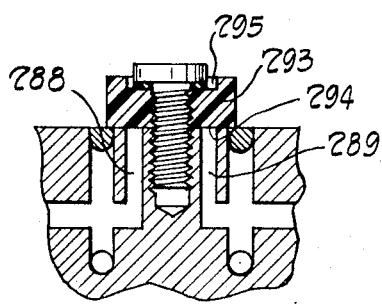
Figure 12:
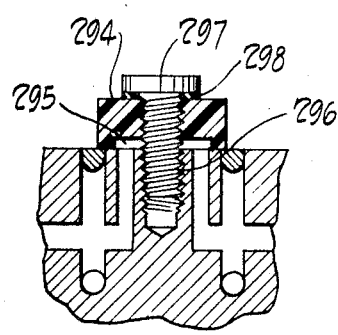
Figure 13:
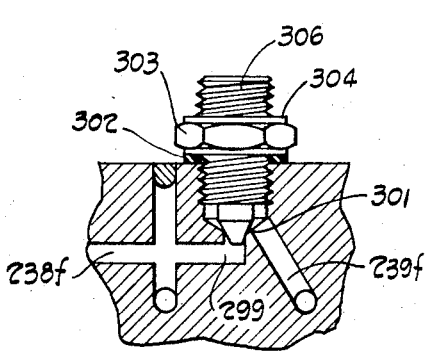
Figure 14:
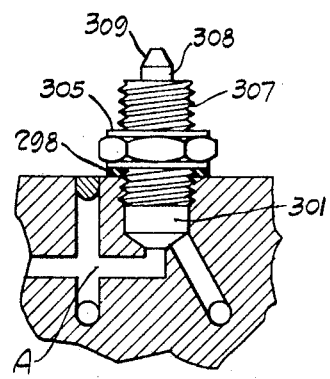
Figure 16:
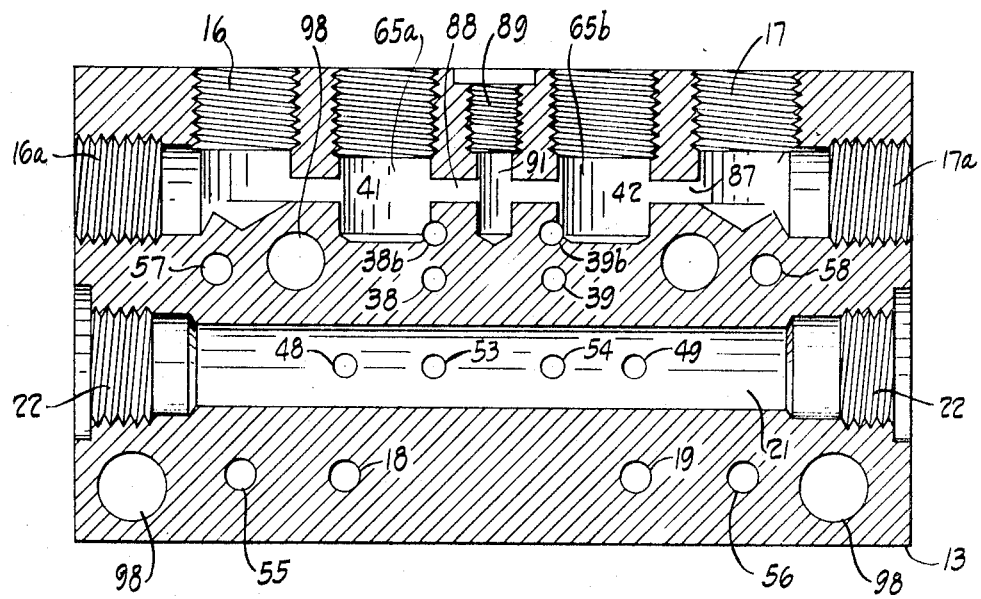
Figure 17:
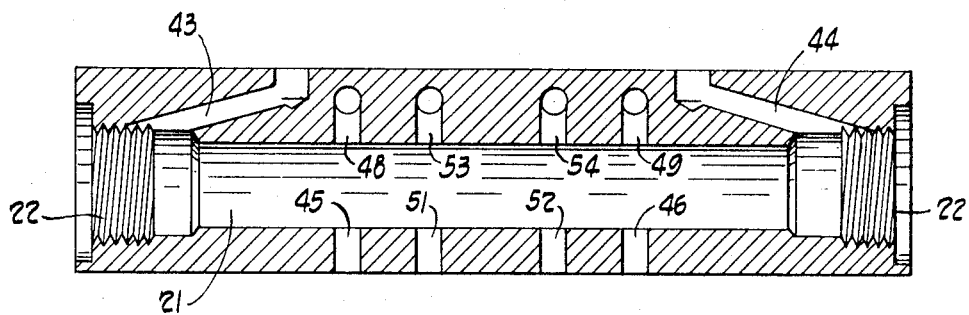
Figure 15:
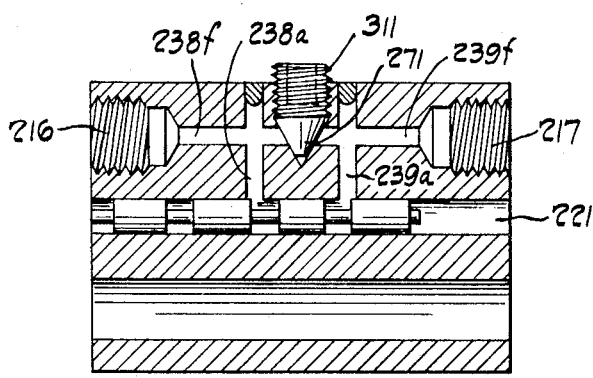
Figure 18:
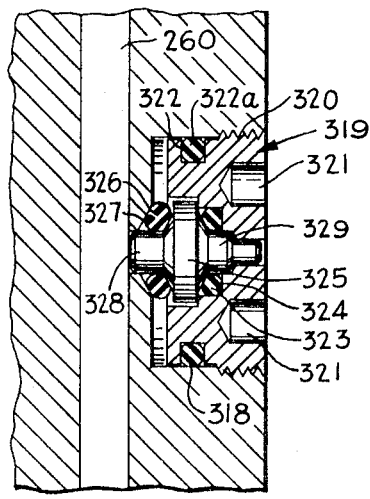
Figure 19:
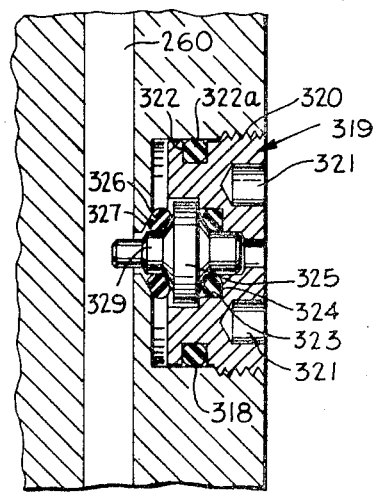
Figure 20:
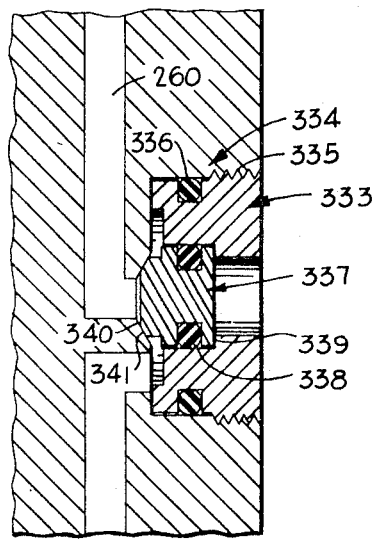
Figure 21:
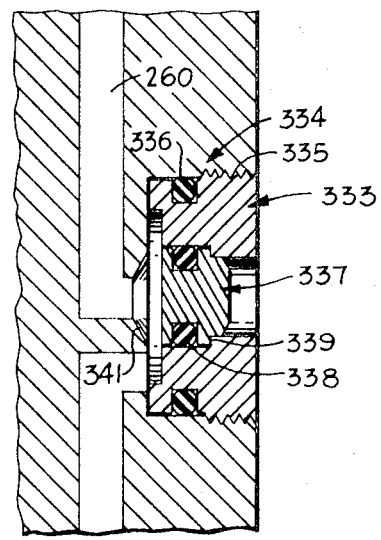

2 indicated in FIG. 3 taken through the center lines of the piston bores of the valve blocks;

FIG. 3 is a view of a section of one of the valve blocks represented as cut by a plane 3—3 through the center line of the piston bore and perpndicular to the section plane of FIG. 2;

FIG. 4 is a side view of the valve block of FIG. 3;

FIG. 5 is a fragmentary view of the valve block of FIG. 3 showing the passageway control plug in position for enabling discharge from both end chambers of a block cylinder to issue from a single outlet opening;

FIG. 5a is a detailed view of the plug lifting washer employed in the arrangement of FIG. 5;

FIG. 6 is a plane view of a spacer employed in conjunction with the valve block assembly of FIGS. 1 and 2;

FIG. 7 is a fragmentary view of a modification in the plug arrangement of FIGS. 3 and 5 showing the passageway control plug in position for blocking interconnection between outlet ports;

FIG. 8 is a view corresponding to FIG. 7 showing the substitution of a shorter plug for enabling outlet ports to be interconnected;

FIG. 8a is a view of a sealing washer employed in conjunction with the arrangement of FIG. 8;

FIG. 9 is a fragmentary view of another modification in the arrangement of FIGS. 3 and 5 showing interconnection between outlet ports closed;

FIG. 10 is a fragmentary view corresponding to FIG. 9 showing interconnection between outlet ports left open;

FIG. 11 is a view of still another modification in the arrangement of FIGS. 3 and 5 with the interconnection closed;

FIG. 12 is a view corresponding to FIG. 11 with the interconnection open;

FIG. 13 is a view of a modification of the arrangement of FIGS. 3 and 5 employing a reversible plug shown in position for closing interconnection;

FIG. 14 is a view corrsponding to FIG. 13 with the passageway control plug reversed for interconnecting outlet ports;

FIG. 15 is a view corresponding to FIG. 3 showing another modification in interconnecting passageways;

FIG. 16 is a view of a section of a modified valve block represented as cut by a plane 16—16 represented in FIG. 17, in which the valve employs inlet ports between the outlet ports and the ends of the cylinder chambers instead of the single inlet port in the center of the piston cylinder between the outlet ports;

FIG. 17 is a view of a section of the valve block of FIG. 16 represented as cut by a plane 17—17 indicated in FIG. 16;

FIG. 18 is a fragmentary view of a modification of the plug arrangement showing the passageway control plug in a position for blocking interconnection between outlet ports;

FIG. 19 is a view corresponding to FIG. 18 showing the passageway control plug in a reversed position enabling outlet ports to be interconnected;

FIG. 20 is a fragmentary view of another modification of the plug arrangement and also showing the passageway control plug in position for blocking interconnection between outlet ports; and FIG. 21 is a view corresponding to FIG. 20 showing the passageway control plug in a reversed position enabling outlet ports to be interconnected.

Like reference characters are utilized throughout the drawings to designate like parts.

Although the invention is not limited to the use of separate valve blocks, for the sake of versatility in enabling a greater or lesser number of outlets to be provided according to the number of bearings or other points to be lubricated, each valve is preferably in a separate valve block.

The flow of lubricant and the action of the pistons in covering and uncovering ports is shown in the schematic diagram of FIG. 1.

In carrying out the invention into practical form with separate valve blocks and separate end blocks, an inlet block 211 and an end block 212 are provided with a plurality of valve blocks 213 clamped between the end blocks 211 and 212 by suitable means such as through bolts (not shown). The inlet block 211 has, as shown, a threaded inlet opening 215 for connection to a source of fluid lubricant under pressure. Outlets 216 and 217 are also provided in each valve block.

The flow of lubricant and the action of the pistons in covering and uncovering ports is shown in the schematic diagram of FIG. 1. Connected to the inlet opening 215 and the inlet block 211 is an inlet passageway 200 which continues through each of the valve blocks and terminates at the end block 212.

Each valve block 213 is drilled lengthwise to form a bore or hollow cylinder 221 (FIGS. 2 and 3) the ends of which are closed by threaded plugs 222. Each cylinder 221 contains piston means shown as being of the 4-landed type. The lands 225 and 226 are separated by a neck portion 227 and the lands 223 and 224 are separated by a neck portion 230. There is also a center stem 231 separating lands 223 and 226 so as to leave a central chamber 232 open in the cylinder 221 between transfer ports 233 and 234 and having an inlet port 247. As shown, the piston is provided with end stems 235 extending outwardly into end chambers 236 and 237 in the cylinder 221.

Outlet passageways 238 and 239 are formed in each block extending from outlet ports 253 and 254 to the outlet openings 216 and 217, respectively. Each outlet passageway may, if desired, be formed in part in one block and in part in an adjacent block for convenience in manufacturing and to enable a discharge from an end chamber in a block to issue from an outlet in the same block.

For each cylinder there is also a pair of transfer passageways 243 and 244. Each transfer passageway 243 or 244 is connected at one end to an end cylinder chamber 236 or 237 and is branched at the other end. Outer branches 245 and 246 are opposite outlet ports 253 and 254. Inner branches 251 and 252 are at the central chamber area 232 so that one or the other of the branches 251 or 252 can communicate with the inlet port 247 according to the longitudinal position of the piston.

As already explained, the blocks are drilled with suitable transverse openings so that the inlet passageway 200 extends through all of the valve blocks of the feeder. In order that the operation may be cyclical with the first valve operating again after the last has operated, additional transverse holes are drilled in the valve blocks to provide return passageways from the upper block to the lower and vice versa. One set of such drilled holes provides interconnecting passageways 255 and 256 for completing the transfer passageways corresponding to passageways 243 and 244 between the uppermost cylinder and the lowermost cylinder and vice versa. Likewise, another set of drilled holes is for forming interconnecting passageways 257 and 258 for completing the outlet passageways corresponding to passageways 238 and 239 between the lowermost block and the uppermost.

The end block 212 is formed with suitable interconnecting passageways including transfer or crossover passageways 261 and 262 connected to interconnecting passageways 255 and 256, respectively, and portions of outlet passageways 263 and 264 connected to interconnecting passageways 257 and 258, respectively. However, in order that reverse movement of the pistons in the upper block will commence after movement in the initial direction of all of the blocks has been completed, a crossover 259 of passageways 261 and 262 is provided so that the passageway 261 is connected to ports of the lowermost cylinder on the right hand side instead of the left and likewise the passageway 262 is connected to ports on the left hand side instead of the right.

As explained, the outlet passageways 238 and 239 are connected to outlet openings 216 and 217, respectively, so as to connect outlet ports 253 and 254 to the outlet openings 216 and 217, respectively. However, in some cases it is desired to provide a double supply of lubricant for some bearings and to cause all of the lubricant flow controlled by one valve to issue from a single outlet opening instead of to issue alternatively from the two outlet openings. To this end an interconnection 260 is provided between the outlet openings 216 and 217; and a fitting 270 indicated schematically in FIG. 1 is provided for enabling the interconnection 260 to be opened or closed selectively according to whether it is desired to expel all of the lubricant from only one of the outlet openings 216 and 217 under control of either of the outlet ports 253 and 254 or to close the interconnection when it is desired to discharge separately to the outlet openings 126 and 217. Although the invention is not limited thereto, as will be explained in greater detail hereinafter, the interconnection between the outlet openings 216 and 217 may be accomplished by cross drilling. It will be observed that the fitting 270 for opening or closing the interconnection 260 is located in the interconnection 260 between the points at which the outlet passageways 238 and 239 are connected to the outlet openings 216 and 217.

In order to simplify the schematic flow diagram and enable the passageways to be shown in a single plane, the actual location of passageways in the blocks has been modified to some extent in the schematic showing of FIG. 1. The actual location in illustrative blocks is shown in FIGS. 2, 3, 4, 5 and 6. FIG. 1 serves, however to illustrate the principle of operation.

By way of example, the action of the upper valve block 213, designated by the suffix $a$, in controlling the movement of the piston in the adjacent or second valve block 213$b$ will first be considered. When lubricant under pressure is applied to the inlet 215, it fills the inlet passageway 200 and issues from the inlet port 247 into the central chamber 232 of the block 213$a$ and enters the branch 251 of the transfer passageway 243. Since the piston in the block 213$a$ is then to the left, the transfer passageway 244 is cut off from the central chamber 232. The fluid pressure is directed to the left hand end chamber of the cylinder in the block 213$b$ causing that piston to move to the right.

When the piston in the valve block 213$b$ moves to the right, it expels lubricant from the right hand end chamber through the transfer passageway 244 and the branch passageway 246 across an intermediate chamber around the piston neck 230 and out through the outlet port 254 and the outlet passageway 239 through the outlet opening 217. The lubricant paths are shown stippled. It is assumed that the fitting 270 has been placed in such a way as to close the interconnection 260. However, if it is desired to have the lubricant issue instead from the outlet opening 216 and join that discharged when the piston in the block 213$b$ moves to the left, this is accomplished by plugging the outlet opening 217 and opening the fitting 270.

When the piston in the block 213$b$ has been moved to the right, it opens appropriate ports for causing the piston in the next valve block to move in the opposite direction and thus continuous cycling operation takes place in the manner described more fully in the aforesaid Higgens patent.

When the block such as the valve blocks 213 are assembled with block 211 and the end block 212, spacers 283 such as illustrated in FIG. 6 are interposed. It will be understood that the thickness of the spacers is distorted in FIG. 1. The fluid circuit paths in the actual valve blocks take place in part through slots in the spacers 283.

Thus, the transfer passageways corresponding to the transfer passageway 243 shown in FIG. 1 are provided in the actual valve blocks as follows:

Referring first to FIG. 2, from the left hand end chamber 236 of the cylinder 221b fluid passes through obliquely drilled transfer passageway opening 243 and a drilled hole in the face of the block, perpendicular to the face, forming a continuation of the passageway 243, a slot 243a in the spacer 283 of FIG. 6 along the faces of the blocks abutting the spacer 283 and into port 251a at the end of the passageway branches 245 and 251 (FIG. 1) shown in FIG. 2 as the slot 243a. Corresponding openings in the blocks and the spacer provide the passageway 244 of FIGS. 1 and 2. The port 233 for the branch 251, as previously explained, is at the central chamber 232 of the cylinder 221 to cooperate with the inlet port 247 and the inlet passageway 200.

The manner in which the outlet passageways are formed is shown in FIG. 3. In the case of the passageway 239 it is formed by a drilled opening 239a intersecting a perpendicular opening 239b, a slot 239c in the spacer 283 (FIG. 6), a drilled hole 239d in the block parallel to the opening 239b and a drilled hole 239e intersecting a drilled hole which includes the interconnecting passageway 260 which continues to the right to the outlet opening 217 in which the portion 239f of the drilled hole constitutes the remainder of the outlet passageway to the outlet opening 217. Corresponding parts of the outlet passageway 238 are represented by the suffixes a to f inclusive. It will be understood that to form the passageways by means of drilled holes it is necessary to drill into the interior of the block from the outer surface and that the holes which are not intended to be open at the exterior surface of the block are closed in a suitable manner as by means of steel balls welded in place as illustrated by the welded balls 286.

The fitting 270 for selectively causing all of the discharge to issue from one of the outlet openings 216 or 217 or for causing the discharge to issue alternately from the openings comprises a frusto-conical member or truncated cone 271 adapted to be fitted into or removed from a conical chamber 272 (shown in FIG. 5) intersecting the interconnecting passageway 260, constituting a part of the lengthwise drilled hole including portions 238f and 239f of the outlet passageways.

Suitable means are provided for securing the truncated cone 271 in the conical chamber 272 and thereby closing the interconnecting passageway 260 when it is desired to discharge from outlet openings 216 and 217 alternatively. When it is desired to plug one of these outlet openings as by a slug 280, and to have all of the discharge issue from the other outlet opening the truncated cone 271 is removed or lifted and the upper end of the conical chamber 272 is closed. To this end the truncated cone 271 preferably consistutes a frusto-conical tip on a plug or screw 273, having a head 274. The screw 273 is fitted into a threaded chamber 275 forming an extension of the upper end of the conical chamber 272. For sealing purposes a plastic insert 276 is provided around the threads of the plug or screw 273 which may take the form of that sold under the trademark Nylok sold by Eaton Yale & Towne Inc. and similar to that described in the copending application of Robert F. Hollinger, Ser. No. 533,984 filed Mar. 14, 1966.

It will be apparent that when the plug 270 is in the position shown in FIG. 3 the interconnecting passageway 260 is closed; the outlet port 253 can control discharge only through the outlet opening 216 from the adjacent valve block cylinder when the piston in the adjacent valve block is moved to the left; and the outlet port 254 can control discharge only through the outlet opening 217 from the adjacent valve block cylinder when the piston therein is moved to the right. However, when the plug 270 is in the position shown in FIG. 5 the interconnecting passageway 260 is open, one of the outlet openings 216 and 217 may be plugged, and the discharge from each end of the cylinder in the adjacent valve block issues from the same outlet opening.

In order to maintain the plug 273 in the proper position when it is desired to open the interconnecting passageway 260, a washer 277 is provided, adapted to fit under the circular seat 278 of the plug head 274 and carrying a target or index such as the words "cross drill" 279, warning the installer or the maintenance personnel that this valve block is set for the operation indicated. It will be understood that for proper sealing of the Nylok insert 276 the head 274 must be brought down tight against the washer 277 and the top surface of the valve block around the threaded bore 275. Although the invention is not limited thereto, the washer or spacer 277 is shown in horseshoe form with an opening 281 to enable it to be inserted or removed without removing the plug 273 and a handle or lug 282 is provided thereon.

As shown by the drawings, no internal drilling is required in order to obtain the alternative connections for single or double outlet from each cylinder, no unsightly external connections are required for this purpose and the valve can be reconverted from single outlet to double outlet very readily if desired. Moreover, there is an obvious indication of which valves have been operated as cross drilled and no confusing numbers or markings are required on the valve.

As shown in FIGS. 7 and 8, the seal or closure for the interconnecting passageway 260, constituting the truncated cone 271 may be separate from the plug 273 and may be held in place when desired by the screw plug 273. When the seal 271 is removed, a "cross drill" marked washer 284 is inserted under the head 285 of the plug 273, sealing around the plug 273, and also indicating that the valve is cross drilled with the two outlet openings in communication with each other.

Although a conical seal gives satisfactory service, the invention is not limited thereto. For example, as illustrated in the arrangement of FIGS. 9 and 10, the outlet passageways 238f and 239f may be provided with right angle branches 288 and 289 opening into the base of a threaded cylindrical well to cooperate with a disc shaped seal 291 and a threaded plug 292 having a head 285 adapted to cooperate with a cross drilled marked washer 284 as in the case of FIGS. 7, 8 and 8a. It will be understood that in the position shown in FIG. 9 the seal 291 is in place and closes outlet passageways 238f and 239f from each other; whereas in the position of FIG. 10 the seal 291 is removed, the plug 292 is lifted and the threaded opening is sealed by the washer 284 under the head 285.

If desired, as shown in FIGS. 11 and 12, the right angle extensions 288 and 289 of the outlet passageways 238f and 239f may be brought to the surface of the valve block and a sealing disc 293 may be provided, having a flat face 294 and a face with a counterbore 295 of sufficient diameter to extend beyond the outlets of the branch passageways 288 and 289. Then with the parts in the position shown in FIG. 11 the flat face 294 of the sealing disc 293 closes the branch passageways 288 and 289 so as to shut off connections between the two outlet openings 217 and 216.

On the other hand, with the sealing disc 293 in the position shown in FIG. 12 the counterbore 295 provides a connection between the branch passageways 288 and 289. For holding the sealing disc 293 in place suitable means such as bolt 296 is provided having a head 297 preferably with a seal 298 under the head 297 to avoid leakage through the threaded opening in the disc 293. In this case the counterbore 295 itself serves as the target or index of condition of the connections between the outlet passageways 238f and 239f.

For the arrangements of FIGS. 3, 4, 7 and 8 a plug may also be provided with a conical tip at one end and a somewhat shorter end without a conical tip so that either connection may be accomplished by inserting either one end or the other of the plug in the threaded opening. This is illustrated in FIGS. 13 and 14. FIGS. 13 and 14 also illustrate an alternative passageway arrangement. The outlet passageway 238f terminates in a conical valve seat 299 formed at the base of a conical recess 301 with which the outlet passageway 239f communicates.

There is a plug 302 having a head 303 with flat circular surfaces 304 and 305 on either side, a short, blunt-ended, threaded shank 306 and a longer threaded shank 307 carrying a reduced diameter end portion 308 with a frustoconical tip 309 adapted to fit the conical valve seat 299. Thus, when the parts are in the position shown in FIG. 13, the tip 309 and the valve seat 299 close the outlet passageway 238f and the sealing washer 298 under the surface 305 seals the outlet passageway 239f. On the other hand, with the parts in the position shown in FIG. 14, the outlet passageways 238f and 239f communicate with each other through the conical chamber 301, which is, however, sealed with respect to the exterior of the valve block by the washer or gasket 298 under the flat surface 304.

FIGURES 18 and 19 disclose a further modification of a fitting or plug which can be positioned to provide for interconnection of outlet passageways. In this modification, the plug or fitting comprises a retaining plug 319 threaded at 320 into an opening or chamber 318 in the block. An annular recess 322 is provided in retaining plug 319 to receive an O-ring 322a to seal the retaining plug 319 in the opening in the block. Recesses 321 are provided in the exposed end of retaining plug 319 to receive a suitable adaptor for threading the retaining plug in the block. Of course, other means for inserting the retaining plug and sealing same in the block may be provided. Retaining plug 319 also contains a recess at 323 for receipt of an O-ring seal 324 for sealing member 325 therein. Member 325 contains opposed conical shoulders for cooperation with O-ring 324 and an O-ring 326 in engagement with conical surface 327 of chamber 318.

In FIGURE 18 retaining plug 319 in cooperation with sealing plug 325 prevents intercommunication in passageway 260 between the outlet passageways in a block. The O-ring 324 seals the sealing plug 325 to the retaining plug 319 whereas O-ring 326 seals the sealing plug 325 to the conical surface 327 of the chamber 318. FIG. 19 discloses a sealing plug 325 in a reversed position in the retaining plug 319. Since end portion 329 of sealing plug 323 is smaller in diameter than end portion 328 thereof and O-ring 326 has been removed, intercommunication in passageway 260 between the outlet passageways of a valve block is provided when the sealing plug is in the position shown in FIG. 19. The ends of portions 328 and 329 of sealing plug 325 may include some indicia to indicate the position of the sealing plug in the retaining plug.

FIGS. 20 and 21 show still another modification of the plug or fitting placed in a chamber in passageway 260 to provide intercommunication between outlet passageways of a block. In the case of this modification, a retaining plug 333 and sealing plug 337 are also provided. Retaining plug 333 is threaded at 335 into an opening or chamber 334 in the block and an annular recess receiving and O-ring 336 seals the retaining plug in the block. The retaining plug may contain a slot or other suitable means for turning the plug into the block. The retaining plug 333 carries a shoulder 339 against which sealing 337 abuts. Sealing plug 337 has a conical nose portion 340 which cooperates with a corresponding conical surface 341 in the chamber 334.

In the position shown in FIG. 20, the retaining plug is sealed in the chamber 334 as mentioned and the sealing plug 337 is sealed within the retaining plug by O-ring 338. The cooperation between the sealing plug and retaining plug through shoulder 339 forces conical surfaces 340 and 341 to engage to prevent intercommunication of outlet passageways in a block through passageway 260.

In the position shown in FIG. 21, sealing plug 337 is reversed and outlet passageway communication is provided through passageway 260. In this position, the sealing plug and retaining plug are sealed with respect to one another and the retaining plug is sealed in the chamber in the block. However, sealing plug 337 does not contain a projection cooperating with conical surface 341 and thus permits flow through passageway 260.

An arrangement in which the piston valve in the cylinder 221 controls the discharge of lubricant from outlet openings 216 and 217 in the same block is illustrated in FIG. 15. In this case the frusto-conical seal 271 for opening or closing the interconnecting passageway 260 is held in place when desired by a plug 311 having a hexagonal socket for receiving a suitable wrench.

As shown in FIG. 3, if desired, additional outlet openings 216a and 217a, shown closed by plugs 290 and 300 may be provided on the side surfaces instead of the end surfaces where this may be more convenient in assembly with a lubrication system. It will be understood that when the side outlets 216a and 217a are employed, the end outlets 216 and 217 will be plugged and vice versa.

The invention has thus far been described as employed specifically in connection with a single line progressive lubricant feeder system of the type described in the aforesaid Higgens patent, with a single inlet port 247 in the central chamber of each cylinder 221. However, the invention is not limited thereto and may be carried out also in connection with single line progressive feeders of a type in which there are two inlet ports 48 and 49 toward the outward end of the hollow valve cylinder 21 as shown in FIG. 16.

In the embodiments of FIGS. 16 and 17 there are two inlet passageways 18 and 19 fed by a common inlet and communicating with inlet ports 48 and 49. Transfer passageways communicaate with the ends of the cylinder 21 and with transfer ports 45 and 46 in an adjacent identical block (not shown) through slots (not shown) in a spacer.

Outlet ports 53 and 54 are provided which communicate through outlet passageways 38 and 39, communicating with drilled holes 38b and 39b, leading through check valves (not shown) mounted in sockets 65a and 65b, and through outlets 41 and 42 to the outlet openings 16a and 17a or 16 and 17, respectively.

For discharging a double supply of lubricant through one of the outlet openings with the other closed a hole 88 is cross drilled between the outlets 41 and 42. In this case a tapered opening 91 is provided which intersects the cross drilled hole 88 and the tapered opening 91 is adapted to receive a tapered pin when it is desired to close off the intercommunicating hole 88. When the hole 88 is to be left open, the threaded opening 89 above the tapered portion 91 is closed by a suitable plug.

Certain embodiments of the invention and certain methods of operation embraced therein have been shown and particularly described for the purpose of explaining the principle of operation of the invention and showing its application, but it will be obvious to those skilled in the art that many modifications and variations are possible and it is intended therefore, to cover all such modifications and variations as fall within the scope of the invention.

What is claimed is:

1. In a lubricant feeder, a block having a pair of outlet passageways each having an end opening to define first and second outlet openings, the block being formed with first and second supply passageways having first and second connections with said outlet passageways, means including a chamber having a conical sealing surface intersecting at least one of said outlet passageways, valve means for supplying lubricant to said first and second supply passageways alternately, a removable and reversible sealing plug inserted into said chamber and including a conical nose portion for engaging said conical sealing surface and sealing said at least one outlet passageway, and a sealing element for sealing said second outlet passageway from the exterior of said feeder, wherein removal of said conical nose portion from sealing engagement with said conical sealing surface provides interconnection between said first and second outlet passageways.

2. An article of manufacture as in claim 1 wherein the plug has a head and a washer is provided adapted to fit under said head and to space the head from the exterior of the block means and lift the frusto-conical tip of the plug out of the conical chamber when it is desired to open both said first and said second passageways to one of said outlet openings.

3. An article of manufacture as in claim 2 wherein the washer is provided with a target to provide an indication as to whether the outlet passageway is opened to both outlet openings or each outlet opening is opened to only a portion of the outlet passageway.

4. Apparatus as in claim 1 further comprising a retaining plug secured in said chamber surrounding said sealing plug, said retaining plug being relatively movable with respect to said sealing plug.

5. Apparatus as in claim 4 wherein a seal is positioned between said sealing plug and said conical sealing surface of said chamber in the block.

References Cited

UNITED STATES PATENTS

| | | |
|---|---|---|
| 1,452,390 | 4/1923 | Rodenhizer. |
| 1,802,002 | 4/1931 | Campbell. |
| 1,825,807 | 10/1931 | Martin. |
| 1,944,428 | 1/1934 | Hammon. |
| 1,956,778 | 5/1934 | Slagel. |
| 1,959,105 | 5/1934 | McCarthy. |
| 2,792,911 | 5/1957 | Harter _____ 184—7 |
| 2,973,058 | 2/1961 | Bricout _____ 184—7 |

FOREIGN PATENTS

| | | |
|---|---|---|
| 840,479 | 1/1939 | France. |
| 952,503 | 5/1949 | France. |
| 280,309 | 12/1964 | Netherlands. |

HOUSTON S. BELL, JR., Primary Examiner

U.S. Cl. X.R.

137—271